United States Patent
Lampic et al.

(10) Patent No.: US 9,862,264 B2
(45) Date of Patent: Jan. 9, 2018

(54) IN-WHEEL ELECTRIC MOTOR

(71) Applicant: ELAPHE pogonske tehnologije, d.o.o., Ljubljana (SI)

(72) Inventors: Gorazd Lampic, Ljubljana (SI); Gorazd Gotovac, Ljubljana (SI); Borut Obrul, Loce (SI)

(73) Assignee: Elaphe Pogonoske Tehnologije, D.O.O., Ljubljana (SI)

( * ) Notice: Subject to any disclaimer, the term of this patent is extended or adjusted under 35 U.S.C. 154(b) by 552 days.

(21) Appl. No.: 14/403,780

(22) PCT Filed: May 10, 2013

(86) PCT No.: PCT/SI2013/000028
§ 371 (c)(1),
(2) Date: Nov. 25, 2014

(87) PCT Pub. No.: WO2013/180663
PCT Pub. Date: Dec. 5, 2013

(65) Prior Publication Data
US 2015/0137669 A1    May 21, 2015

(30) Foreign Application Priority Data

May 29, 2012    (SI) .................................. 201200169

(51) Int. Cl.
*H02K 11/00*    (2016.01)
*H02K 9/00*    (2006.01)
(Continued)

(52) U.S. Cl.
CPC ............ *B60K 7/0007* (2013.01); *B60L 3/108* (2013.01); *H02K 1/30* (2013.01); *H02K 7/006* (2013.01);
(Continued)

(58) Field of Classification Search
CPC ................................. H02K 7/006; B06K 1/00
(Continued)

(56) References Cited

U.S. PATENT DOCUMENTS

| 2005/0247496 | A1* | 11/2005 | Nagaya ..................... B60G 3/01 |
| | | | 180/65.51 |
| 2006/0070778 | A1 | 4/2006 | De Veny et al. ............ 180/65.1 |

(Continued)

FOREIGN PATENT DOCUMENTS

| CA | 2621599 | 8/2009 | ............... B60K 7/00 |
| DE | 102006004085 | 8/2007 | ............. G02B 27/01 |
| EP | 0492290 | 7/1992 | ............... B60K 7/00 |

*Primary Examiner* — Jose Gonzalez Quinones
(74) *Attorney, Agent, or Firm* — MacCord Mason PLLC

(57) ABSTRACT

The invention refers to a mechanical design for a simple and accurate to assemble in-wheel electric motor comprising at least stator, rotor plate, rotor tube, bearing system and brake system arranged in such a way that rotor plate is attached to the rotor tube and to the bearing system and where the opening of the rotor tube and stator is on at least one axial side larger than the largest braking system or bearing system part. Brake system and bearing system parts and attachment points are accessible when rotor plate and outer parts of brake system, bearing system and the rim are removed. The rim is a separate part of the rotor plate and rotor tube. The rotor plate attachment to the bearing system is done in parallel to the rim attachment and is preventing loosening up. On at least one of the flanges there is an edge with its height smaller than the smallest radial cranny between the rotor tube and the stator.

21 Claims, 2 Drawing Sheets

Figure 1:
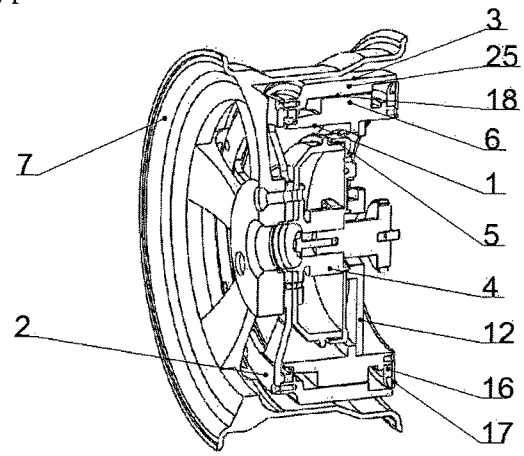

(51) Int. Cl.
*B60K 7/00* (2006.01)
*B60L 11/00* (2006.01)
*H02K 7/00* (2006.01)
*H02K 7/102* (2006.01)
*H02K 7/14* (2006.01)
*B60L 3/10* (2006.01)
*H02K 1/30* (2006.01)
*H02K 15/00* (2006.01)

(52) U.S. Cl.
CPC ............... *H02K 7/102* (2013.01); *H02K 7/14* (2013.01); *B60K 2007/0038* (2013.01); *B60K 2007/0092* (2013.01); *B60L 2200/12* (2013.01); *B60L 2220/44* (2013.01); *H02K 15/0006* (2013.01); *Y02T 10/641* (2013.01)

(58) Field of Classification Search
USPC .................. 310/67 R, 55; 180/55, 65.5, 65.1
See application file for complete search history.

(56) References Cited

U.S. PATENT DOCUMENTS

| | | | |
|---|---|---|---|
| 2006/0108170 A1* | 5/2006 | Ishikawa ................ | B60T 8/171 |
| | | | 180/282 |
| 2006/0158050 A1* | 7/2006 | Maeda ..................... | B60K 6/26 |
| | | | 310/58 |
| 2012/0001521 A1 | 1/2012 | Shiraki et al. ............. | 310/67 R |

* cited by examiner

IN-WHEEL ELECTRIC MOTOR

The field of the invention is a mechanical design for a simple and accurate to assemble in-wheel electric motor, which can be used in electric and hybrid cars as well as other electric vehicles. The invention considers the comprehensive mechanical design, comprising an electric motor design, installation of the rim, integration of the brake and the bearing system.

In-wheel electric motors are successfully gaining popularity in the electric two-wheelers and are gradually conquering first electric cars and other vehicles. From the total mass and energy efficiency point of view in-wheel electric motors are becoming competitive to central electric propulsion systems with mechanical transmissions. Existing mechanical designs of electric motor do not provide additional functionality or simplification of the installation or service yet, but provide especially and only necessary mechanical strength of the system.

The main problems of the existing mechanical designs of in-wheel electric motors are connected with the lack of space for the installation and a number of the rotating parts. Electric motor can be assembled in accordance to the existing solutions, but its dismantling process is complicated and desires special tools, what prevents braking system to be maintained easily. It is also hard to achieve the appropriate accuracy of the assembly process. In addition the existent solutions don not allow shipping of an electric motor without the bearing or without some other integrated parts.

Patent EP0699140 includes a hollow bearing system, but does not solve the problem of the brake integration and poorly solves the sealing problem, as it does not provide suitable solutions for the small diameter seals. Patent EP1108584 does not solve the problem of the brake integration and focuses especially on the approximate position of the actuators in the calipers of the disc brake. Patent EP1690725 includes an additional nozzle for the rim fixation point and integrated mechanical gear. Patent WO/2009/086884 includes only the solution with the disk brake. Also none of the patents solves the key problem of the accurate positioning and fitting of the rotor and stator when dismantling the brake, bearing system or the whole motor.

The in-wheel electric motor covered by this invention successfully solves the key problems of the mechanical design, as it allows shipping of the electric motor without mounted bearing system or the brake, it also allows performance of the brake maintenance tasks without disassembling a complete in-wheel electric motor or dismantling the electric motor from the vehicle. It prevents all the parts from the mechanical damage, which could occur as the consequence of fitting the rotor on the stator and allows easy assembly of the motor.

The invention is represented by the following drawings:
FIG. 1: Section of the in-wheel electric motor
FIG. 2: In-wheel electric motor and a vehicle
FIG. 3: Rotor and stator assembly
FIG. 4: Edges on the stator and rotor plate at the contact with the bearing system
FIG. 5: Edges on the rotor plate at the contact with the rotor tube
FIG. 6: The fixation system of the rim onto the rotor plate Drawings are showing the solution with outer rotor motor construction, drum brake and standard automotive hub. It is understandable, that the solution can also be used in inner rotor motor, with click brakes, different bearing system or in some other possible layouts.

The solution for a simple and accurate to assemble in-wheel electric motor is an innovative mechanical construction comprising at least stator 1, rotor plate 2, rotor tube 3, bearing system 4 and brake system 5 which are arranged and connected in such a way that rotor plate 2 is screwed, or attached by some other means, to the rotor tube 3 and to the bearing system 4 wherein the opening of the rotor tube 3 and the opening of the stator 1 are on at least one axial side larger than cross section of the largest braking system 5 or bearing system 4 part as viewed from any direction. Brake system 5 is integrated between bearing system 4 and the active part of stator 1 as shown in FIG. 1. By this design simple disassembly and assembly of the motor and its part is enabled. If not required, stator 1 can be assembled as one piece or as an assembly of more pieces, such as stator plate and stator tube. If one piece is used, then casting is a possible production method.

Figure 2:
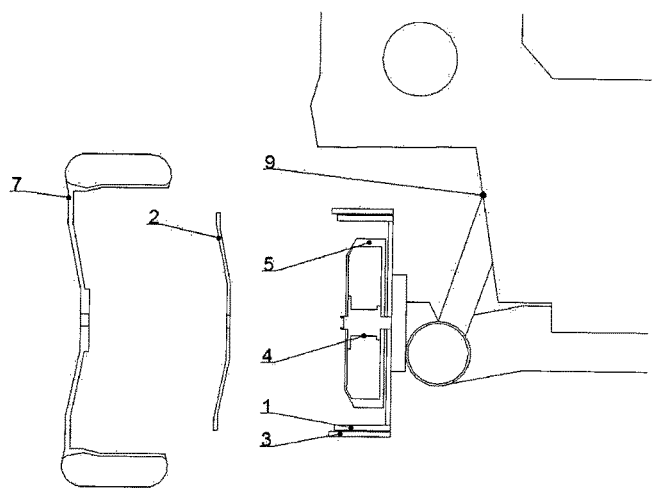

Braking system 5 is integrated inside the motor and outside of the bearing system 4 in such a way that its parts and their attachment points are accessible from at least one axial direction, so that they can be easily disassembled. The cross-section of all braking system 5 parts is smaller than the opening of the rotor tube 3 and the stator 1. All the parts are of the shape that there exists a continuous path through empty space between the place where said system performs its function during operation and the exterior of the motor, through which brake system 5 parts can be removed from the motor when rim 7, rotor plate 2 and outer brake system 5 and bearing system 4 parts are removed and when the rotor tube 3 and stator 1 do not have to be disassembled or detached from the vehicle as shown in FIG. 2. By this invention the break system 5 maintenance is easily performed.

Also the bearing system 4 is designed in such a way that its parts and attachment points are accessible from at least one axial direction and that exists the continuous path trough empty space between the place where said system performs its function during operation and the exterior of the motor through which bearing system 4 parts can be removed from the motor when rim 7, rotor plate 2 and outer brake system 5 and bearing system 4 parts are removed and when the rotor tube 3 and stator 1 do not have to be disassembled. By this solution the maintenance of the bearing system 4 can be performed easily.

Figure 6:
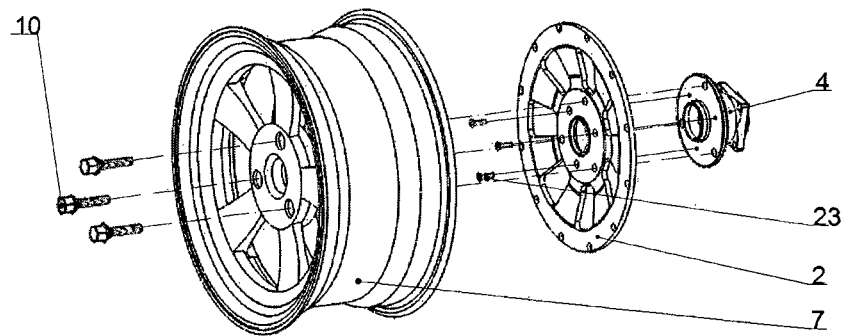

As shown on FIG. 6 a rim is a separate part of the rotor plate 2 and rotor tube 3 and is attached to the bearing system with the number and size of the screws according to the bearing system 4 requirements or by a mechanically stronger attachment method and where rotor plate 2 is attached to the bearing system 4 with additional weaker attachment method as the rim 7.

The rotor plate 2 attachments can be realized with spring washer or any other attachment method preventing loosening up when stronger attachment method is used in parallel. Since we have two parallel systems, we have to make sure that one does not loosen during the operation.

Figure 4:
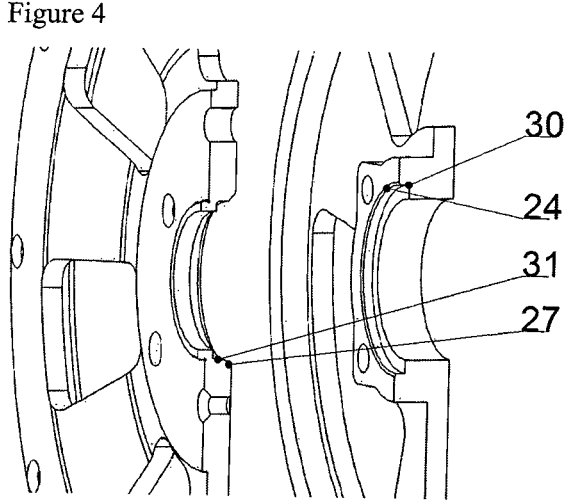

As shown in FIG. 4, there is, on at least one of the flanges, an inclined edge with its height is smaller than the smallest radial cranny between rotor tube 3 and stator 1. It can be the edge between the bearing system 4 and stator plate 24, or it can be an edge between the bearing system 4 and rotor plate 2 or it can be the edge between the rotor plate 2 and rotor tube 3. By this design we significantly simplify and improve the accuracy of the assembly process.

Figure 5:
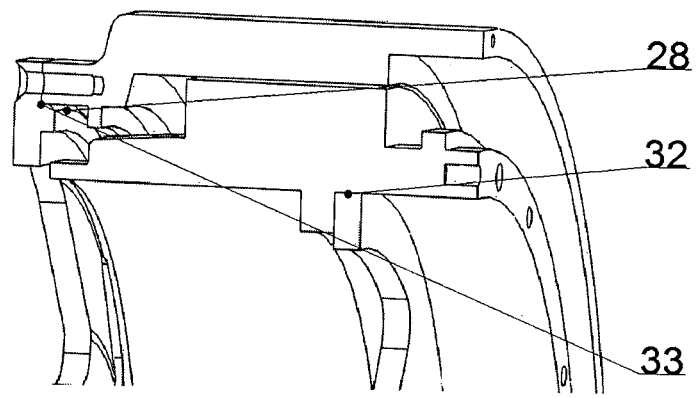

The solution also comprises of at least one radial cranny between the rotor tube 3 and stator 1, which is thinner than the magnetic gap 18 as shown in FIG. 5. The neighboring surfaces are made of surface good mechanical resistant materials and for ordinary operation of the motor not crucial materials. With this cranny the rotor magnets and stator blades are prevented from hitting each other.

A stator plate or stator tube 12 comprises slots or processed surfaces or any other means of attachment for the pins for tight attachment of rotor tube 3 to stator unrelated to rotor plate or bearing system. Also the surfaces of the stator or rotor tube can be machined or any other material for the fixation is prepared.

Figure 3:
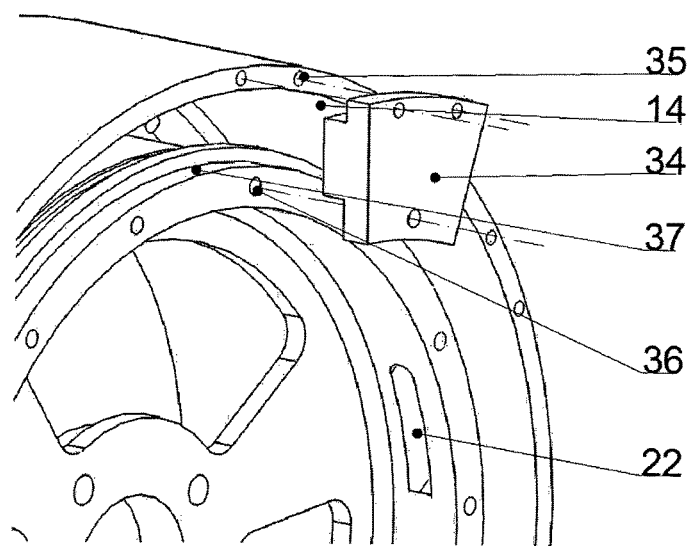

As shown on FIG. 3, stator 1 comprises of stator positioning slots or holes 36 through which and through the rotor attachment points 37 pins 34 can attach stator to rotor positioning slots or holes 37. Instead of pins 34 also other methods of stator 1 and rotor tube 3 fixation are possible when rotor plate 2 or bearing system 4 are removed. Stator positioning slots or holes 36 can also be used for attaching the seal shield 17 or for any other purpose. With this, the production is further simplified.

For adequate sealing purpose two seals are responsible. The first one is placed between break system 5 and one axial side of magnetic gap 18 between rotor tube 3 and stator tube and the second one between break system 5 and the other axial side of magnetic gap 18 between rotor tube 3 and stator tube.

Rotor plate 2 has openings which connect brake system 5 with the surroundings, so that the dust from the brake can be removed. There is at least one seal between the rotor plate 2 and the magnetic gap 18.

It is also possible to design a stator plate with openings, so that the winding connection or brake system 5 connections or some other connections or simply for allowing the air flow from the surroundings to the motor internal space. Between the stator plate openings and magnetic gap 18 there is at least one seal.

The winding connection cables can exit the motor in tangentially limited section not necessary wider than 45 degree. This in addition simplifies the assembly and disassembly process of the motor.

Also an ABS sensor or position sensor can be placed inside the hole in the bearing system 4. The solution is the most simple if the automotive hub for drive shaft is used, since it has a hole already produced in the inner rotating part of the bearing.

The invention claimed is:

1. An in-wheel electric motor including a stator comprising a stator plate or a stator tube, rotor plate, rotor tube, bearing system and brake system the improvement comprising the rotor plate is attached to the rotor tube and to the bearing system wherein the opening of the rotor tube and the opening of the stator are on at least one axial side larger than cross section of the largest braking system part as viewed from any direction, and the stator plate or the stator tube comprises slots or processed surfaces or any other means of attachment for the pins for tight attachment of rotor to stator unrelated to rotor plate or bearing system.

2. The in-wheel electric motor according to claim 1, wherein brake system and bearing system attachment points are adapted to be accessible when rotor plate and outer parts of brake system and bearing system are removed.

3. The in-wheel electric motor according to claim 2, wherein the brake system parts are shaped in a way that the continuous path through empty space between the place where brake system parts perform their function during operation and the exterior of the motor exists through which brake system parts can be removed from the motor when the rim, rotor plate and outer brake and bearing system parts are removed and when the rotor tube and stator do not have to be disassembled.

4. The in-wheel electric motor according to claim 2, wherein the bearing system parts are shaped in a way that the continuous path through empty space between the place where bearing system parts perform their function during operation and the exterior of the motor exists through which bearing system parts can be removed from the motor when rim, rotor plate and outer brake and hub parts are removed and when the rotor tube and stator do not have to be disassembled.

5. The in-wheel electric motor according to claim 1, wherein the brake system parts are shaped in a way that the continuous path through empty space between the place where brake system parts perform their function during operation and the exterior of the motor exists through which brake system parts can be removed from the motor when the rim, rotor plate and outer brake and bearing system parts are removed and when the rotor tube and stator do not have to be disassembled.

6. The in-wheel electric motor according to claim 1, wherein the bearing system parts are shaped in a way that the continuous path through empty space between the place where bearing system parts perform their function during operation and the exterior of the motor exists through which bearing system parts can be removed from the motor when rim, rotor plate and outer brake and hub parts are removed and when the rotor tube and stator do not have to be disassembled.

7. The in-wheel electric motor according to claim 1, wherein the rim is a separate part of the rotor plate and the rotor tube which is attached to the bearing system with the number and size of the screws according to the bearing system requirements or by a mechanically stronger attachment method and where the rotor plate is attached to the bearing system with additional weaker attachment method as the rim.

8. The in-wheel electric motor according to claim 7, wherein the rotor plate attachment is done trough spring washer or any other attachment method preventing loosening up when stronger attachment method is used in parallel.

9. The in-wheel electric motor according to claim 1, wherein the rotor plate attachment is done through spring washer or any other attachment method preventing loosening up when stronger attachment method is used in parallel.

10. The in-wheel electric motor according to claim 1, wherein at least one of the flanges comprises inclined edge with its height is smaller than the smallest radial cranny between rotor tube and stator.

11. The in-wheel electric motor according to claim 1 comprising of at least one radial cranny between the rotor tube and stator, which is thinner than the magnetic gap.

12. The in-wheel electric motor according to claim 1, wherein seal or seals' shield attachment holes are used as stators' positioning holes.

13. The in-wheel electric motor according to claim 1, wherein rotor plate has openings which connect brake system with the surroundings and where there is at least one seal between the rotor plate and the magnetic gap.

14. The in-wheel electric motor according to claim 1, wherein stator plate has openings where cooling tubes or brake connections are guided through or where air can flow through and where there is at least one seal between the stator plate and the magnetic gap.

15. The in-wheel electric motor according to claims 1, wherein winding connection cables are entering the motor at the tangential section not wider than 45 degrees.

16. The in-wheel electric motor according to claim 1, wherein ABS sensor or position sensor is placed inside the hole in the bearing system.

17. An in-wheel electric motor including a stator, stator tube, rotor plate, rotor tube, bearing system and brake system the improvement comprising the rotor plate is attached to the rotor tube and to the bearing system wherein the opening of the rotor tube and the opening of the stator are on at least one axial side larger than cross section of the largest braking system part as viewed from any direction, and the stator tube comprises of positioning slots or holes through which and through the rotor attachment points pins can attach stator to rotor.

18. The in-wheel electric motor according to claim 17, wherein seal or seals' shield attachment holes are used as stators' positioning holes.

19. An in-wheel electric motor including a stator, stator tube, rotor plate, rotor tube, bearing system and brake system the improvement comprising the rotor plate is attached to the rotor tube and to the bearing system wherein the opening of the rotor tube and the opening of the stator are on at least one axial side larger than cross section of the largest braking system part as viewed from any direction, and further comprising of at least two seals wherein the first one is placed between brake system and one axial side of magnetic gap between rotor tube and stator tube and the second one between brake system and the other axial side of magnetic gap between rotor tube and stator tube.

20. The in-wheel electric motor according to claim 19, wherein rotor plate has openings which connect brake system with the surroundings and where there is at least one seal between the rotor plate and the magnetic gap.

21. The in-wheel electric motor according to claim 19, wherein stator plate has openings where cooling tubes or brake connections are guided through or where air can flow through and where there is at least one seal between the stator plate and the magnetic gap.

\* \* \* \* \*